United States Patent [19]

Scott et al.

[11] Patent Number: 4,633,137

[45] Date of Patent: Dec. 30, 1986

[54] GLAZE POLISHED POLYCRYSTALLINE ALUMINA MATERIAL

[75] Inventors: Curtis E. Scott, Eastlake; Charles I. McVey, Twinsburg, both of Ohio

[73] Assignee: General Electric Company, Schenectady, N.Y.

[21] Appl. No.: 666,858

[22] Filed: Oct. 31, 1984

[51] Int. Cl.⁴ .................. C04B 35/10; H01J 61/30
[52] U.S. Cl. ............................ 313/636; 313/634; 501/153
[58] Field of Search ............. 501/153; 313/635, 636, 313/634

[56] References Cited

U.S. PATENT DOCUMENTS

| | | | |
|---|---|---|---|
| 3,026,210 | 3/1962 | Coble | 501/153 |
| 3,935,495 | 1/1976 | Scott, Jr. et al. | 313/631 |
| 4,033,743 | 7/1977 | Scott, Jr. et al. | 65/30.1 |
| 4,079,167 | 3/1978 | Scott, Jr. et al. | 428/409 |
| 4,150,317 | 4/1979 | Laska et al. | 501/153 |
| 4,285,732 | 8/1981 | Charles et al. | 501/101 |

*Primary Examiner*—Mark L. Bell
*Attorney, Agent, or Firm*—J. F. McDevitt; Philip L. Schlamp; Fred Jacob

[57] ABSTRACT

Increased optical transmission is provided for a body of optically transparent polycrystalline alumina by coating at least one major surface of said alumina body with a solid glaze coating and subsequently melting said coating at elevated temperatures to dissolve the surface alumina grains in physical content therewith to provide a smoother surface when the coating residue has been removed. More particularly, a solid glaze coating is first deposited on said major surface of the alumina body and the coated alumina body thereafter heated to sufficiently elevated temperatures for the glaze liquification whereupon surface alumina grains in physical contact therewith are dissolved in a manner which reduces the high spots on the individual surface alumina grains without materially introducing low spots at the grain boundaries and wherein the individual alumina surface grains have been preferentially etched in certain of the crystalline axis directions. The present glaze material comprises an alkali metal borate other than lithium borate having an alkali metal oxide to boron oxide weight ratio in the range from about 1:2 up to 1:4 and which is deposited on the major surface of said alumina body as a liquid suspension.

14 Claims, 4 Drawing Figures

GLAZE POLISHED POLYCRYSTALLINE ALUMINA MATERIAL

The present invention relates to an optically transparent body of high density, polycrystalline alumina wherein at least one of the major surfaces is polished with a particular type molten fluxing agent for increased optical transmission. A tubular form of the glaze polished material when used as the light transmissive envelope for an improved high intensity electric discharge lamp provides a higher light output than is conventionally obtained with the unpolished material. Such improved envelope material is particularly useful in high intensity sodium vapor lamp constructions utilizing a grade of the polycrystalline alumina which already exhibits superior optical transmission in the unpolished condition as compared with earlier polycrystalline alumina ceramic.

The original polycrystalline alumina material made according to U.S. Pat. No. 3,026,210 (Coble), assigned to the assignee of the present invention, is still widely used for the light transmissive envelope in high intensity electric discharge lamps. This polycrystalline alumina ceramic is characterized by a relatively uniform large grain size and can be prepared with a minimal of secondary phase magnesia-alumina spinel at the grain boundaries. In U.S. Pat. No. 4,150,317, also assigned to the present assignee, there is disclosed a further improved optical grade of said alumina ceramic consisting essentially of relatively uniform equiaxed grains of alumina containing no more than about 150 ppm magnesium with essentially no porosity and secondary phase. Said material exhibits increased in-line transmission and is further characterized by the substantial absence of grain-growth promoting impurities and a pore volume fraction no greater than about $10^{-2}$. The average grain size of said material is approximately 26 microns diameter with substantially all grains having an average diameter in the range extending from about 20 microns diameter up to about 35 microns diameter. Whereas the original Coble material contained a small but effective amount up to about 0.5 weight percent magnesia content, a reduction in the magnesia content was found to impart greater control over grain growth as well as pore removal for less light scattering in the sintered product. A still more recently issued U.S. Pat. No. 4,285,732, also assigned to the assignee of the present invention, discloses a further improved grade of said optically transparent ceramic consisting essentially of alumina, magnesium and a component select from the group consisting of zirconium, hafnium and mixtures thereof. Magnesium is present in said further improved alumina material at amounts equivalent to from about 0.03% MgO by weight to less than about 0.15% MgO by weight of said sintered material, zirconium being present at amounts equivalent to from higher than about 0.002% $ZrO_2$ by weight up to about 0.07% $ZrO_2$ by weight of said sintered material, and hafnium being present at amounts equivalent to from higher than about 0.003% $HfO_2$ up to about 0.12% $HfO_2$ by weight of the sintered material. Mixtures of these additives are said to comprise all ratios of zirconium and hafnium in amounts equivalent to from higher than 0.002% by weight up to about 0.12%.

It is also known to improve optical transmission in the foregoing polycrystalline alumina materials by a flux polishing treatment as taught in U.S. Pat. Nos. 3,935,495; 4,033,743; and 4,079,167, also all assigned to the present assignee. The unpolished ceramic material is immersed in a molten inorganic flux selected from the group consisting of alkali metal salts and binary oxide systems having an alkali metal oxide constituent which dissolves the surface alumina grains and produces a relatively smooth surface appearance. In said treatment, the high spots of the individual surface alumina grains are reduced without materially etching the grain boundaries and the flux residue is removed from the treated ceramic generally by acid washing at near ambient temperatures. This selective etching process is carried out in the molten inorganic flux bath at temperatures up to around 1000° C. with more elevated temperatures producing undesirable grain boundary etching accompanied by excessive volatilization of the fluxing agent being used. The preferred flux material is a eutectic composition of sodium borate salt at molar ratios between two moles $B_2O_3$ up to four moles $B_2O_3$ per one mole $Na_2O$. Certain difficulties have been experienced with said prior art molten flux treatment, however, including a need to contain the molten flux in platinum vessels along with contamination of the molten flux by surface impurities contained in the alumina bodies being polished. The latter problem makes it difficult to control the treatment process while having to conduct said process in a container of the molten flux is not adaptable to using automated handling equipment for this task.

It is desirable, therefore, to carry out the flux polishing treatment in a manner avoiding the foregoing difficulties. By eliminating a molten flux bath for said treatment, it is further possible to reclaim polycrystalline alumina arc tubes which have been contaminated during the manufacture of high pressure sodium vapor lamps. It would also be desirable to polish polycrystalline alumina arc tubes by treating only the exterior major surface and thereby avoid having to remove flux residue from the tube interior. The polishing can also be used to alter the physical dimensions of alumina parts being fitted together in various product applications.

SUMMARY OF THE INVENTION

It has now been discovered that said polycrystalline alumina bodies can be polished with a particular glaze coating for improved optical transmission. More particularly, a solid glaze coating is first deposited on one or more major surfaces of the alumina body and the coated body thereafter heated to elevated temperatures of at least 800° C. which melts this coating and dissolves the surface alumina grains in physical contact therewith. The coating residue is thereafter removed from the surface of the treated ceramic by conventional means to provide optical transmission improvement comparable with that produced by molten flux bath immersion. Specifically, the present method of increasing optical transmission for an already optically transparent body of sintered polycrystalline alumina comprises:

(a) depositing a solid glaze coating on at least one major surface of said alumina body which dissolves the surface alumina in physical contact therewith when subsequently melted at elevated temperatures, said solid glaze coating comprising an alkali metal borate other than lithium borate having an alkali metal oxide to boron oxide weight ratio in the range from about 1:2 up to 1:4, (b) heating said coated alumina body to elevated temperatures of at least about 800° for a sufficient time period to liquify the glaze coating and dissolve the surface alumina grains, (c) removing the coating residue from the surface of said alumina body.

A lithium borate glaze is unsuitable in the present method by reason of producing relatively insoluble crystals on the treated surface which cannot thereafter be removed during the acid washing step. The solid glaze coating is conveniently deposited on the alumina surface from a liquid suspension or solution. An especially preferred method of depositing the solid glaze coating employs a preformed frit of the alkali metal borate fluxing agent suspended in an organic liquid. Since this preformed frit remains somewhat water-soluble, the employment of an organic liquid as the suspending medium avoids loss of the frit from the surface deposit. A drawback experienced with depositing the solid glaze coating from a liquid solution of the glaze forming oxides is a lesser solid coating thickness which may not prove adequate in subsequently removing all contaminated surface alumina. Said drawback with a liquid solution deposition of the glaze material renders the treatment process more difficult to control. On the other hand, the term "glaze" as used in the present specification denotes either a solid coating of the vitreous fluxing agent or a solid coating of the powdered batch material used to produce said vitreous fluxing agent. Increasing the viscosity of said vitreous fluxing agent when melted to carry out the present polishing method is also desirable. Up to about 20 weight percent $SiO_2$ in the glaze material serves this purpose.

The present treatment produces an optically transparent sintered polycrystalline alumina body having at least one glaze polished major surface and wherein the individual alumina surface grains have been preferentially etched in certain crystalline axis directions. Accordingly while said method still dissolves alumina at the surface of the polycrystalline alumina body being treated in a manner producing surface smoothness, there is preferential etching of the alumina grains in at least one of the crystalline axis directions. This type of preferential etching although still dissolving the surface layer of alumina grains rather than dissolving material at the grain boundaries produces less etching of those surface alumina grains which are not physically aligned in the preferred crystalline axis direction. Certain dark spots appearing in microphotographs of the glaze polished alumina surface represent alumina grains protruding from an otherwise flat polished surface. As previously indicated, a polycrystalline alumina body treated in accordance with the present invention may comprise high purity alumina containing a small but effective amount up to about 0.5 weight percent magnesia or consist essentially of relatively uniform equiaxed grains of alumina containing no more than about 150 ppm magnesium and having essentially no porosity or secondary phase. The latter alumina material also has an average grain size of approximately 26 microns diameter with substantially all grains having an average diameter in the range extending from about 20 microns diameter up to about 35 microns diameter. Another preferred alumina composition which can be polished in accordance with the present method consists essentially of alumina, magnesium and a component selected from the group consisting of zirconium hafnium and a mixture thereof in relative proportions above indicated.

An illustrative high intensity discharge lamp according to the present invention employs a glaze polished polycrystalline alumina arc tube as the light transmissive envelope. Said improved lamp construction includes electrodes being sealed into the ends of said light transmissive envelope which also contains an ionizable medium for producing said discharge. The present improvement resides in utilizing as the light transmissive envelope a tube consisting essentially of an optically transparent sintered polycrystalline alumina having at least one major surface glaze polished so as to reduce the high spots on the individual surface alumina grains without materially introducing low spots at the grain boundaries for increased optical transmission upon glaze removal and wherein the individual alumina surface grains have been preferentially etched in certain of the crystalline axis directions. In accordance with said improvement, the glaze polishing treatment increases optical transmission of an arc tube by up to about 20% or greater in total transmission and with the lumen output of a representative high pressure sodium vapor lamp employing said arc tube exhibiting similar improvement.

DESCRIPTION OF THE PREFERRED EMBODIMENTS

Figure 1:
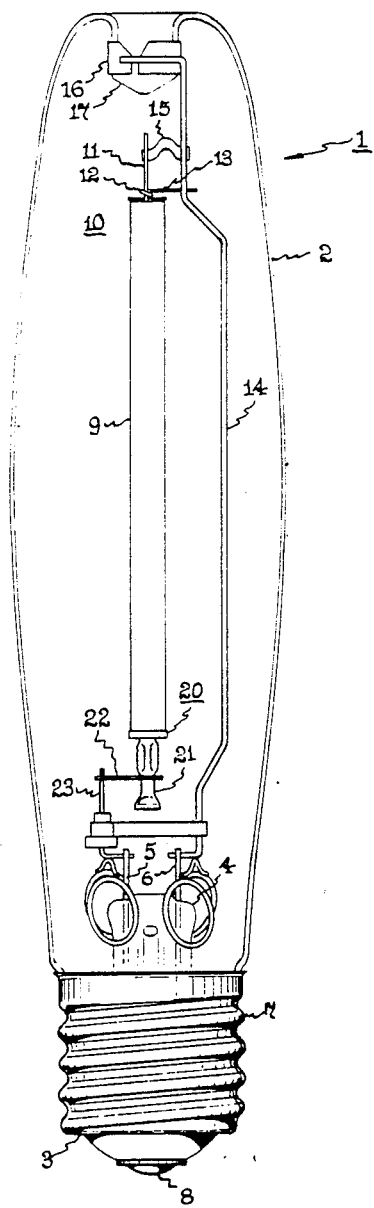
FIG. 1 is a schematic view of a jacketed high pressure sodium vapor lamp employing the improved glaze polished polycrystalline alumina material of the present invention.

A typical high pressure sodium vapor discharge lamp utilizing the present improvement is illustrated in FIG. 1. Said lamp 1 corresponds to a 400-watt size lamp contained within an outer vitreous envelope or jacket 2 of elongated ovoid shape. Said vitreous outer envelope 2 has a standard mogul screw base 3 attached to one end and comprises a reentrant stem press seal 4 through which extends, in conventional fashion, a pair of relatively heavy lead-in conductors 5 and 6 whose outer ends are connected to the screw base shell 7 and eyelet 8 of the base. The inner envelope or arc tube 9 centrally located within said outer envelope comprises a length of light-transmitting polycrystalline alumina ceramic tubing which has been glaze polished according to the present method. The upper end of said arc tube is sealed by closure means 10 more fully described in another U.S. Pat. No. 4,034,252, assigned to the assignee of the present invention, through which extends a niobium lead wire 11 hermetically sealed thereto. The inlead supports the upper electrode which may be generally similar to the lower electrode and with both of said electrodes being more specifically described in the following FIGS. 2–3 embodiments. The external portion of inlead 11 passes through a loop 12 in transverse support wire 13 which is attached to side rod 14. This arrangement permits thermal expansion of the arc tube during lamp operation when the lower end seal is rigidly fixed in place, and the resilient metal ribbon 15 assures good electrical connection. Side rod 14 is welded to lead-in conductor 6 and has its upper end braced by spring clamp 16 which engages inverted nipple 17 in the dome end of the outer vitreous envelope. The lower end closure 20 for said lamp has a central aperture through which extends a thin walled niobium tube 21 serving both as an exhaust tube and as an inlead. Said tube extends but a short distance through the end closure and is hermetically sealed therethrough by sealing frit as will be further explained in the description given for the FIG. 3 embodiment dealing with said end closure. The closed arc tube is supported in the outer envelope by connector 22 which is welded across from tubular inlead 21 to a support rod 23 joined to lead-in conductor 5.

Figure 2:
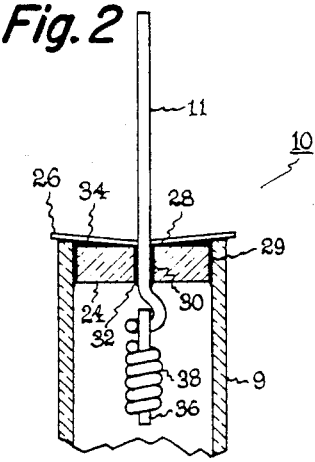
FIG. 2 is an enlarged detailed view of one end closure employed in the FIG. 1 lamp embodiment.

Upper ceramic closure 10 for the above described lamp embodiment detail is shown in FIG. 2. Specifically, said ceramic closure 10 comprises a ceramic plug 24 which is entirely inserted into one end of the arc tube and has a metal cross piece 26, which can be a short wire length, joined to in-lead 11 at the exterior surface 28 of said ceramic plug. Said cross piece is bent or arched slightly about its mid point in a horizontal plane transverse to said in-lead in order to have its ends engage the edges of the arc tube and physically support the thermionic electrode joined thereto. A hermetic seal 29 is formed in the annular recess between the assembled ceramic plug and inner wall of the arc tube as hereinafter further explained. A second hermetic seal 30 is formed at the central opening 32 in ceramic plug 24 and which extends to a ridge of sealing frit 34 on the surface of said plug reaching up to the cross piece 26. All hermetic sealing in the illustrated closure embodiment can be provided with a measured quantity of sealing glass frit being placed on the ceramic plug, suitably as a slurry and the closure assembly then being heated to the melting point of the glass frit. The molten frit is drawn by capillary action into the annular free space between the arc tube and ceramic plug as well as into the free space formed between the central opening in said plug with the electrode in-lead. Said in-lead 11 is joined to tungsten shank 36 of a conventional thermionic electrode 38 having one or more refractory metal coils wound around and which is further described in the aforementioned U.S. Pat. No. 4,034,252.

Figure 3:
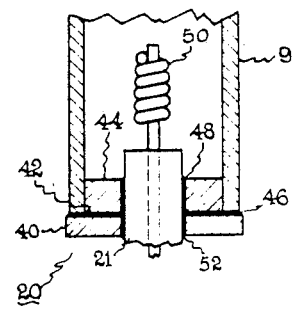
FIG. 3 is an enlarged detailed view of the remaining end closure employed in said FIG. 1 lamp embodiment.
Figure 4:
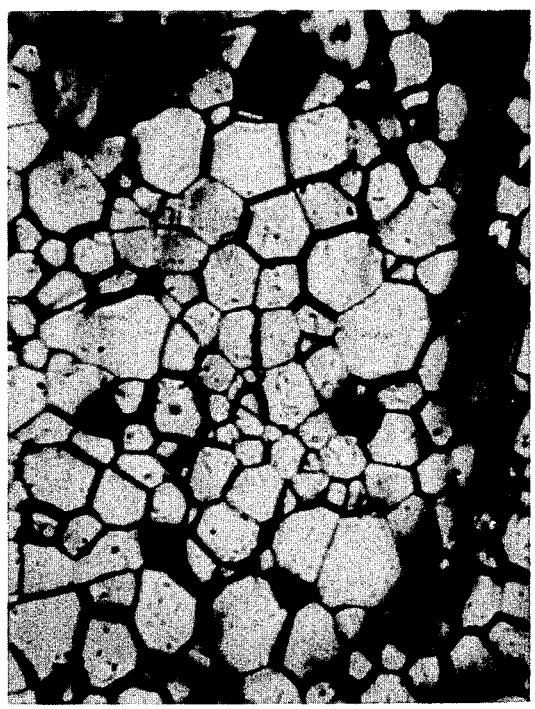
FIG. 4 is a microphotograph at 120 times magnification illustrating glaze polished polycrystalline alumina material according to the present invention.

The lower ceramic closure 20 for the above lamp embodiment is shown in FIG. 3. Specifically, said improved ceramic enclosure 20 comprises assembly of a ceramic disk 40 having a larger diameter than the inner diameter of said arc tube 9 which is hermetically sealed with ceramic sealing frit at one end of said arc tube as well as the outermost surface 42 of a ceramic plug 44 which has been inserted into the end of said arc tube. The butt-sealed interface between said ceramic disk 40 and ceramic plug 44 is formed with a ring or washer 46 of ceramic frit material which further provides a hermetic seal 48 to associated electrode structure 50. Said conventional electrode 50 is shown to include part of a metal exhaust tube and in-lead member 21 that is inserted through a central opening 52 in both said ceramic disk and ceramic plug for hermetic sealing after assembly of said component parts. As can be noted, hermetic sealing 48 between the electrode and ceramic components is generally limited to sealing engagement with the plug member only.

Regarding the present departure from the prior art method of flux polishing as taught in the aforementioned U.S. Pat. No. 3,935,495, representative samples of unpolished polycrystalline alumina tubing were subjected to both polishing treatments for comparison of the relative degree of improvement in optical transmission attributable thereto. All tubing samples used in said comparison consisted of alumina tubing contaminated with surface impurities which reduced light transmission therethrough. One group of said alumina tubing samples was polished by immersion in a molten bath of alkali metal borate under conditions producing an approximately 50 micron thickness removal of the surface alumina grains. The remaining group of said tubing samples was glaze polished twice with an aqueous solution of borax, potassium carbonate and boric oxide which resulted in approximately 25 microns thickness removal of the surface alumina grains during each polishing treatment. The total optical transmission improvement produced with both polishing treatments is reported in Table I below.

TABLE I

| Type Tubing | Total Transmittance (%) |
|---|---|
| Unpolished | 78.3 |
| Immersion Polished | 94.2 |
| Glaze Polished | 94.3 |

As can be noted from the Table I results, comparable improvement in total optical transmission can be achieved in accordance with the present invention without contaminating a molten flux both medium as was experienced in the prior art method. It can also be appreciated that a similar improvement would result in the decontamination of polycrystalline alumina arc tubes which have become contaminated during assembly in high intensity electric discharge lamps.

To still further illustrate the nature and degree of the present improvement as applicable to said high intensity electric discharge lamps, another comparison was made wherein 400 watt size high pressure sodium vapor test lamps were constructed employing polycrystalline alumina arc tubes before and after the glaze polishing treatment. Accordingly, a first group of said test lamps employed unpolished arc tubes having the optical transmittance reported in the following Table II whereas a second group of said test lamps utilized arc tubes from the same manufacturing lot which had been polished twice with the aforementioned glaze composition to provide the optical transmittance improvement also reported in said Table. The lumen gain experienced for the test lamps constructed in said manner is also reported in said Table to confirm that the benefit impacted to the arc tubes by glaze polishing is reflected in the lamp operation.

TABLE II

| Type Arc Tube | Total Transmittance (%) | Lamp LPW (100 Hours) |
|---|---|---|
| Unpolished | 75.0 | 102.7 |
| Glaze Polished | 93.5 | 124.6 |

As can be noted from the foregoing test results, the improved lumen per watt values attributable to glaze polishing exceeded 20% as did the improved optical transmittance responsible for this improvement. A detailed example is provided below illustrating preparation of the preformed frit that represents an especially preferred glaze composition for use according to the present invention. Also included in said example are representative conditions for such use of the frit composition.

EXAMPLE

Approximately 119 grams of borax, were mixed with 87 grams boric oxide, 13 grams silica, and 43 grams of potassium carbonate and this mixture thereafter melted in a platinum vessel at approximately 900° C. to form a glass material that was poured into water to produce a frit. The frit was then ground to a powder that passed thru a 120 mesh size screen. A liquid suspension of said frit material was prepared again in a conventional manner employing approximately 75 grams of the powder being suspended in approximately 56 grams isopropanol, 3 grams of a polyvinyl pyrrolidone binder, and 0.6 grams of a glycerol trioleate dispersant. A solid coating of the suspended frit material was next deposited on unpolished polycrystalline alumina tubing by removal of the liquid solvent under ordinary ambient drying conditions. The coated alumina tubing was next heated in air to temperatures in the range 875°–1025° C. for 30 minutes to 2 hours in order to melt said coating and remove the underlying alumina surface. Temperatures above 1025° C. were avoided to prevent extensive volatilization of the frit coating which occurred after 1 hour of exposure and which produced a rough and pitted alumina surface. Flux residue was thereupon removed by washing the treated tubing in a heated dilute aqueous HCl solution.

The appearance of a properly polished alumina surface in accordance with the present invention is illustrated in the accompanying FIG. 3 photomicrograph. As can be noted from said photograph, the polished surface is of a generally flat nature wherein most high spots on the individual alumina particles have been removed without introducing significant low spots at the grain boundaries. The few dark spots appearing in said photograph represent alumina grains protruding from the otherwise flat polished surface.

It will be apparent from the foregoing description that various modifications can be employed in the present polishing method without departing from the spirit and scope of the present invention. For example, various minor additions can be made to the particular alumina materials above specifically described without altering the ability of said material to be glaze polished in accordance with the present invention. Additionally, the glaze material can be modified other than above specifically illustrated with minor additions of other additives to further enhance rheological characteristics during the treatment steps. It is intended to limit the present invention, therefore, only by scope of the following claims:

We claim:

1. An optically transparent sintered polycrystalline alumina body with opposing major surfaces and having but one of said major surfaces selectively glaze polished so as to reduce the high spots on the individual surface alumina grains without materially introducing low spots at the grain boundaries for increased optical transmission upon glaze removal and wherein the individual alumina surface grains have been preferentially etched in certain crystalline axis directions, said glaze polished surface being further substantially devoid of contamination from impurities otherwise contained in the polycrystalline alumina body being polished or transferred to said polished surface from contaminated glaze medium and with said glaze polish producing improved optical transmission at a lesser removal of the polycrystalline alumina material.

2. A polycrystalline alumina body as in claim 1 comprising high purity alumina containing a small but effective amount up to about 0.5 weight percent magnesia.

3. A polycrystalline alumina body as in claim 1 consisting essentially of relatively uniform equiaxed grains of alumina which contains no more than about 150 ppm magnesium and essentially no porosity and secondary phase, said body exhibiting increased in-line transmission and being further characterized by a substantial absence of grain-growth promoting impurities and a pore volume fraction no greater than about $10^{-2}$.

4. A polycrystalline alumina body as in claim 3 having an average grain size of approximately 26 microns diameter.

5. A polycrystalline alumina body as in claim 3 wherein substantially all grains have an average diameter in the range extending from about 20 microns diameter up to about 35 microns diameter.

6. A polycrystalline alumina body as in claim 1 consisting essentially of alumina, magnesium and a component selected from the group consisting of zirconium, hafnium and mixtures thereof.

7. A polycrystalline alumina body as in claim 6 wherein magnesium is present in an amount equivalent to from about 0.03% MgO by weight to less than about 0.15% MgO by weight of said sintered body, zirconium is present in an amount equivalent to from higher than about 0.002% $ZrO_2$ by weight up to about 0.07% $ZrO_2$ by weight of said sintered body, hafnium is present in an amount equivalent to from higher than about 0.003% $HfO_2$ by weight up to about 0.12% $HfO_2$ by weight of said sintered body, and mixtures thereof are composed of all ratios of zirconium and hafnium in an amount equivalent to from higher than 0.002% of the dioxides by weight up to about 0.12% of the dioxides by weight of the sintered body.

8. An improved high intensity electric discharge lamp comprising a light transmissive envelope having electrodes sealed into its ends and containing an ionizable medium for producing said discharge, wherein the improvement comprises utilizing as the light transmissive envelope a tube consisting essentially of optically transparent sintered polycrystalline alumina with inner and outer opposing major surfaces having only said outer major surface selectively glaze polished so as to reduce the high spots on the individual surface alumina grains without materially introducing low spots at the grain boundaries for increased optical transmission upon glaze removal and wherein the individual alumina surface grains have been preferentially etched in certain of the crystalline axis directions, said glaze polished surface being further substantially devoid of contamination from impurities otherwise contained in the polycrystalline alumina body being polished or transferred to said polished surface from contaminated glaze medium and with said glaze polish producing improved optical transmission at a lesser removal of the polycrystalline alumina material.

9. An electric discharge lamp as in claim 8 wherein the polycrystalline alumina comprises high purity alumina containing a small but effective amount up to about 0.5 weight percent magnesia.

10. An electric discharge lamp as in claim 8 wherein the polycrystalline alumina consists essentially of relatively uniform equiaxed grains of alumina which contains no more than about 150 ppm magnesium and essentially no porosity and secondary phase, said alumina exhibiting increased in-line transmission and being further characteristized by a substantial absence of grain-growth promoting impurities and a pore volume fraction no greater than about $10^{-2}$.

11. An electric discharge lamp as in claim 10 wherein the polycrystalline alumina has an average grain size of approximately 26 microns diameter.

12. An electric discharge lamp as in claim 10 wherein the polycrystalline alumina has substantially all grains having an average diameter in the range extending from about 20 microns diameter up to about 35 microns diameter.

13. An electric discharge lamp as in claim 8 wherein the polycrystalline alumina consists essentially of alumina, magnesium and a component selected from the group consisting of zirconium, hafnium and mixtures thereof.

14. A polycrystalline alumina body as in claim 13 wherein magnesium is present in an amount equivalent to from about 0.03% MgO by weight to less than about 0.15% MgO by weight of said sintered body, zirconium being present in an amount equivalent to from higher than about 0.002% $ZrO_2$ by weight up to about 0.07% $ZrO_2$ by weight of said sintered body, hafnium is present in an amount equivalent to from higher than about 0.003% $HfO_2$ by weight up to about 0.12% $HfO_2$ by weight of said sintered body, and mixtures thereof are composed of all ratios of zirconium and hafnium in an amount equivalent to from higher than 0.002% of the dioxides by weight up to about 0.12% of the dioxides by weight of the sintered body.

* * * * *